No. 660,020. Patented Oct. 16, 1900.
W. A. MARSHALL.
LUMBER CART.
(Application filed June 19, 1900.)
(No Model.)
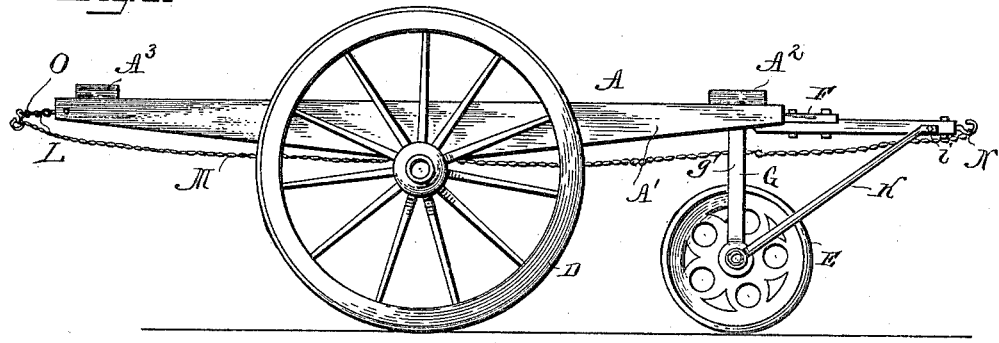
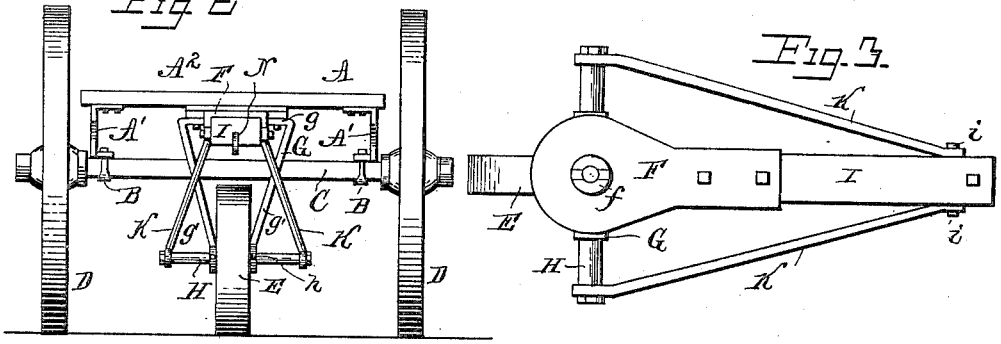
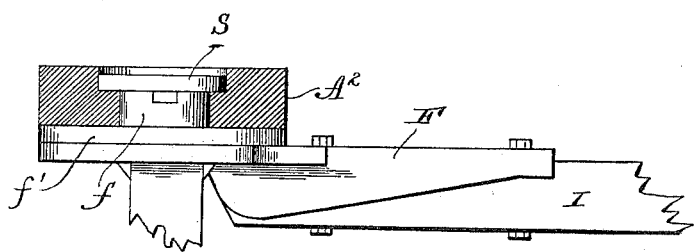
Witnesses
A. W. Beall
W. S. Duvall
Wm. A. Marshall,
Inventor,
by John S. Thomas & Co.,
Attorneys

UNITED STATES PATENT OFFICE.

WILLIAM A. MARSHALL, OF WASHBURN, WISCONSIN.

LUMBER-CART.

SPECIFICATION forming part of Letters Patent No. 660,020, dated October 16, 1900.

Application filed June 19, 1900. Serial No. 20,847. (No model.)

*To all whom it may concern:*

Be it known that I, WILLIAM A. MARSHALL, a citizen of the United States of America, residing at Washburn, in the county of Bayfield and State of Wisconsin, have invented new and useful Improvements in Lumber-Carts, of which the following is a specification.

This invention is an improvement in lumber-carts; and the object of the same is to provide a cart of this character of such construction that a number of them can be connected to each other to form a train and the said train drawn by draft-animals.

In the carting of lumber from a mill to the dock it is customary to load the lumber on a cart, and men are employed to push the cart to the dock. It is the purpose of my invention, therefore, to provide a cart having a pivoted guide-wheel in front and connect a number of such carts together to form a train, the connection being made by a draft-chain in such manner that the carts can be disconnected at any point for the purpose of unloading the same.

With the above objects in view the invention consists of a lumber-cart comprising a rectangular body supported upon a transverse axle, upon the ends of which the large ground-wheels are mounted, and pivotally connecting to the forward end of the truck or body a guide-wheel from the supports of which project a braced tongue, the rear end of the truck being provided with a looped chain or bridle, to which the draft-chain is attached.

The following specification enters into a detail description of my invention, reference being had to the accompanying drawings and to letters of reference thereon which designate the different parts, and what I claim as my invention, and desire to secure by Letters Patent, is specifically set forth in the appended claims.

In the drawings, Figure 1 is a side elevation of a lumber-cart constructed in accordance with my invention. Fig. 2 is a plan view of the cart. Fig. 3 is an enlarged detail sectional view of the pivoted bearing for the guide-wheel. Fig. 4 is a detail view.

Referring to said drawings, A designates a rectangular frame which forms the body of the cart and is composed of metal side pieces A' A' and wooden front and rear cross-pieces A² and A³, respectively. The lower edges of the side pieces incline downwardly from each end, and about centrally they are bent inward to receive metal straps B, which secure in place the main axle C, upon the ends of which are mounted the ground-wheels D. The forward end of the truck is provided with a pivotal support, in which is mounted a guide-wheel E, said support comprising a casting F, to which is bolted the upper portion $g$ of a bent flat bar G, the depending side members $g'$ of said bar converging slightly and at their lower ends are enlarged to provide bearings for the long axle H, upon which the said guide-wheel is mounted, the axle being secured in the bearings by set-screws $h$. The casting F has a pivot projection $f$, which turns in the washer $f'$ and forward cross-bar A² and is held by a disk S.

Projecting forwardly from the casting F is a tongue I, the said casting having a socket in which the tongue is bolted. This tongue is braced to the depending bars or supports for the guide-wheel by means of inclined brace-rods K, connected to the outer ends of the extended axle of the guide-wheel and extending therefrom to the outer end of the tongue, to which they are bolted by a bolt $i$. The outer end of the tongue is provided with an opening or eye $i'$, to which the draft-chain is attached.

Connected to the rear ends of the side pieces of the truck is a chain L of such length as to have a little slack in it, for the purpose hereinafter described.

M designates the draft-chain, which is for the purpose of connecting several carts to each other in a train, and in order to provide for quickly connecting the carts to said draft-chain a hook N is attached to the forward end of the tongue and a hook O attached to the center of the chain or bridle L.

By the construction of cart as herein shown and described a number of such carts can be connected to each other in succession, the long draft-chain being first attached to the hook at the end of the tongue and then to the hook at the center of the bridle or chain at the end of said cart, and in this manner any number of carts can be connected to said chain and be drawn thereby, the draft-animals being connected to the first cart. In drawing a train the carts will properly turn a curve or round a corner as they arrive at the point, as each cart in turning slackens one side of the bridle and tightens the other, so that every cart will make the same curve. It will be understood that in attaching the carts to the draft-chain the said draft-chain is slackened under the cart in order to permit the guide-wheel to turn sufficiently to guide the cart around a curve. This particular manner of hauling lumber affords a considerable saving, as it will require but a small number of men and two or three draft-animals to handle a long train, where it is now customary to have the carts pushed by men and at least one man to each cart. The carts can also be readily detached, so that a cart can be dropped out for the purpose of unloading it.

Having thus described my invention, what I claim as new, and desire to secure by Letters Patent, is—

1. A lumber-cart, comprising a body or frame having an axle extending across the central portion thereof, wheels mounted upon said axle; a pivoted guide-wheel at the forward end of the body, a tongue projecting from the supporting-frame of said guide-wheel, and a chain extending across the rear end of the cart; together with a draft-chain connected to the end of the tongue and to the central part of the chain at the rear end of the cart, substantially as shown and for the purpose set forth.

2. A lumber-cart, comprising a body or frame supported centrally upon an axle having wheels mounted upon the ends thereof, a pivoted wheel-frame at the forward end of the body presenting depending bars supporting an axle extended beyond said bars, a casting to which the depending bars are bolted, a tongue bolted to the casting, and brace-rods extending from the ends of the extended axle to the outer end of the tongue; a hook attached to the end of the tongue; a chain fastened to the end of the body and extending from one side to the other, and a hook attached to the center of said chain; together with a draft-chain adapted to be attached to the aforesaid hooks, substantially as shown and for the purpose set forth.

In testimony whereof I affix my signature in presence of two witnesses.

WILLIAM A. MARSHALL.

Witnesses:
WM. J. MAITLAND,
JOHN NEUDORFER.